US012196547B2

(12) United States Patent
Rupoli (10) Patent No.: US 12,196,547 B2
(45) Date of Patent: Jan. 14, 2025

(54) METHOD AND APPARATUS FOR DETECTING THE CONFIGURATION OF ELONGATED ELEMENTS

(71) Applicant: SCHNELL S.P.A., Colli al Metauro (IT)

(72) Inventor: Simone Rupoli, Colli al Metauro (IT)

(73) Assignee: SCHNELL S.P.A., Colli Al Metauro (IT)

( * ) Notice: Subject to any disclaimer, the term of this patent is extended or adjusted under 35 U.S.C. 154(b) by 382 days.

(21) Appl. No.: 17/610,014

(22) PCT Filed: May 14, 2020

(86) PCT No.: PCT/IT2020/050120
§ 371 (c)(1),
(2) Date: Nov. 9, 2021

(87) PCT Pub. No.: WO2020/230181
PCT Pub. Date: Nov. 19, 2020

(65) Prior Publication Data
US 2022/0214153 A1 Jul. 7, 2022

(30) Foreign Application Priority Data
May 14, 2019 (IT) .................. 102019000006816

(51) Int. Cl.
*G01B 5/25* (2006.01)
*B21D 3/02* (2006.01)
(Continued)

(52) U.S. Cl.
CPC .................. *G01B 5/25* (2013.01); *B21D 3/02* (2013.01); *G01B 5/285* (2013.01); *G01L 5/0061* (2013.01);
(Continued)

(58) Field of Classification Search
CPC ..... G01L 5/0061; G01L 5/0076; G01L 5/009; G01L 5/0085; G01B 5/285; G01B 5/25; B21D 3/02
See application file for complete search history.

(56) References Cited

U.S. PATENT DOCUMENTS 1,239,175 A 9/1917 Gilbert
4,459,842 A * 7/1984 Kihara ..................... G01B 7/34
73/159
(Continued)

FOREIGN PATENT DOCUMENTS

DE 3729619 A1 3/1989
DE 19651422 A1 6/1998
(Continued)

*Primary Examiner* — Paul M. West
(74) *Attorney, Agent, or Firm* — McGlew and Tuttle, P.C.

(57) ABSTRACT

The method for detecting the configuration of elongated elements includes the steps of providing along a supply line (A) a drawing and/or straightening assembly (4) for an element (2), a detection station (S) downstream of the drawing and/or straightening assembly, a detection assembly (3) comprising at least a first contact member (31, 32, 31a, 31b, 32a, 32b) arranged in the detection station (S) and shaped to interact in contact with the element (2) to force the element (2) along the supply line (A) if the configuration of the element (2) deviates with respect thereto. Said at least first contact member (31, 32, 31a, 31b, 32a, 32b) is associated with a sensor device (33, 33) comprising a sensitive element (35, 35') configured to emit an signal indicating a stress produced by the contact between said at least first contact member (31, 32, 31a, 31b, 32a, 32b) and the element (2), at least when the element (2) is forced along the supply line (A).

23 Claims, 8 Drawing Sheets

(51) Int. Cl.
*G01B 5/28* (2006.01)
*G01L 5/00* (2006.01)
(52) U.S. Cl.
CPC .......... *G01L 5/0076* (2013.01); *G01L 5/0085* (2013.01); *G01L 5/009* (2013.01)

(56) References Cited

U.S. PATENT DOCUMENTS

| | | | | |
|---|---|---|---|---|
| 6,658,947 | B1* | 12/2003 | Sendzimir | ............... B21B 38/02 |
| | | | | 73/862.474 |
| 2009/0044583 | A1 | 2/2009 | Daube et al. | |
| 2016/0339493 | A1* | 11/2016 | Ueno | ...................... B21B 37/68 |

FOREIGN PATENT DOCUMENTS

| | | |
|---|---|---|
| EP | 1402966 A2 | 3/2004 |
| EP | 2399856 A1 | 12/2011 |
| JP | S5973090 U | 5/1984 |
| JP | H02229620 A | 9/1990 |
| WO | 2017183010 A1 | 10/2017 |

\* cited by examiner

METHOD AND APPARATUS FOR DETECTING THE CONFIGURATION OF ELONGATED ELEMENTS

TECHNICAL FIELD

The present invention relates to an apparatus and a method for detecting the configuration of elements having elongated shape, in particular metal section bars and rods for reinforced concrete and similar products, in particular subjected to a drawing and/or straightening process.

BACKGROUND OF THE INVENTION

Apparatus for processing elongated elements, in particular metal sections and similar products, which comprise drawing and/or straightening units are known.

In particular, these units are used to draw and/or straighten rods, in bars or wrapped in rolls which, even if carried out by rolls and straightened, may still have an irregular configuration, or, respectively, a more residual curvature, more or less accentuated, unsuitable for subsequent processing or for direct use on site.

The aforementioned apparatuses may comprise, for example, drawing and/or straightening units made by means of a plurality of pairs of counter-rotating wheels, respectively arranged opposite and/or staggered along the supply line. In particular, the rod unrolled by rolls may be fed between pairs of staggered wheels along a supply line, so that each section of the metal element in transit is subjected to cyclical yielding actions by bending, therefore bending and counter-bending actions, aimed at eliminating their original curvature and/or unevenness.

U.S. Pat. No. 1,239,175 shows for example an apparatus for straightening metal wires, comprising a first set of counter-rotating wheels and a second set of counter-rotating wheels, arranged on mutually orthogonal planes.

Apparatuses are also known which are provided with devices for measuring the residual curvature of the elongated metal elements, in particular subjected to a drawing and/or straightening process.

For example, WO2017/183010 illustrates a detection assembly associated with a drawing and/or straightening assembly.

EP 2399856 shows a straightening device for straightening wires, comprising a succession of straightening rollers arranged along a cable feeding line. According to an illustrated embodiment, the device comprises a force sensor for detecting whether there is a contact between the cable and the straightening rollers.

EP 1402966 shows an apparatus for straightening iron bars, provided with a final correction unit, for correcting the residual curvature of the bars.

However, the devices of the known type do not permit the measurement of irregularities of the configuration or of any residual curvatures of the fed element to be reliably performed.

In particular, the known solutions do not enable reliable detection of the configuration of the elongated element due, for example, to the considerable oscillations to which it is subjected, when it is cantilevered by the processing apparatus.

Also, in any case, the known solutions do not permit to detect the configuration of a pair of elements which are simultaneously fed along a supply line, as often happens in the specific sector of the working of iron rods.

Finally, it should be noted that the metal elements usually have, on the external surface, a series of ribs, which make any detection difficult.

DISCLOSURE

The present invention aims at solving the mentioned problems by devising a method and an apparatus for detecting the configuration of elongated elements, in particular of metal elements, which permit to obtain reliable indications, in particular for elements subjected to a drawing and/or straightening process.

Another object of the present invention is to provide an apparatus for detecting the configuration of elongated elements, having simple construction and functional conception, provided with safe and reliable use, as well as with a relatively economic cost.

A further object of the present invention is to be able to reliably detect the configuration of the aforementioned elements, in particular in the presence of at least one bending unit configured to bend the aforementioned elements, thus inducing oscillations, which may affect the detection in known apparatuses.

The mentioned objects are achieved, according to the present invention, by the detection method according to claim 1, as well as by the detection apparatus according to claim 6.

According to the invention, the apparatus for detecting the configuration of elongated elements, in particular metal elements, comprises a drawing and/or straightening assembly, a detection station positioned downstream of the drawing and/or straightening assembly, as well as a detection assembly comprising at least a first contact member arranged in said detection station.

Said at least first contact member is shaped to interact in contact with the elongated shape element, in said detection station, for forcing the same element along the supply line if the configuration of the element is deviant with respect to it.

Said at least first contact member is associated with a sensor device comprising a sensitive element configured to emit a signal indicating a stress produced by the contact between the contact member itself and the element, at least when the element is forced by said contact member along the supply line.

In addition, the apparatus may comprise at least one cutting assembly downstream of the aforementioned detection station and/or at least one bending unit configured to bend such elongated elements.

The arrangement of the detection station along the supply line, downstream of the drawing and/or straightening assembly, permits to obtain an optimal detection, minimizing the distance between a portion of the element being detected and a portion of the same element in which it is possible to make a possible correction.

According to the invention, more precisely, said at least first contact member is arranged in the detection station, so that the element is in contact with it when it is fed through said detection station along the supply line.

According to the invention, the aforementioned sensitive element is advantageously configured to emit a signal indicating said stress, for example of traction or compression, which is made by the element on the contact member.

More precisely, the sensitive element may detect any stress transmitted by the elongated element to the contact member, as it passes through the detection station, due to the force that it may make on it.

This stress may be produced, in particular, by the presence, in the configuration of the elongated element, of irregularities or deviations from for example the rectilinear configuration of the supply line along which the detection station is arranged and along which it is forced and, in particular, drawn, the elongated element.

Said indicator signal is preferably proportional to the extent of the stress detected.

In practice, said contact member, interacting with the elongated element in the detection station, forces the element itself to take a configuration corresponding to rectilinear configuration, for example, of the supply line.

If the element has a deviant configuration with respect to the imposed one, which may be for example rectilinear, then it reacts, exerting a greater stress on the detection assembly the greater said deviation is.

Therefore, according to a prerogative of the invention, said sensitive element is configured to detect any stress, in particular in any direction, that is exerted by a portion of the element in contact with the detection assembly arranged in the detection station, preferably in a fixed way, along the supply line.

More precisely, at said portion of the elongated element, the possible presence of deviations with respect to a configuration substantially coinciding with said supply line, affects these compression or traction stresses, which are transmitted to the detection assembly through contact with it.

In particular, in the presence of a configuration of the elongated element locally spaced or deviating from the supply line, for example in the presence of a curved or irregular configuration, this stress may undergo variations, preferably detectable continuously, by the sensitive element, in particular in the sense of an increase or a decrease of a compression exerted on the detection assembly or on respective support means.

The extent of these stresses or, correspondingly, of constraint reactions on the mechanical support parts, are detectable, according to the invention, through said at least one sensitive element, and made available, for example to measure the curvature and/or its orientation in space and/or equivalently, the degree of straightness of the portion of the elongated element in contact with the detection assembly, or for directly processing correction instructions, in feedback, intended for mechanical parts of the drawing and/or straightening and/or on members dedicated to the correction of straightening.

More precisely, the method according to the invention and the apparatus that implements it provide for measuring the stress between the elongated element and the sensitive element, so as to appreciate the extent and/or orientation of any distortion of the elongated element with respect to a desired, preferably rectilinear configuration.

Advantageously, according to the invention, the aforementioned feedback may therefore be operated automatically by the apparatus by means of special actuator means, or, more simply, by the operator himself, who, thanks to the detection assembly, may directly verify the effect of the adjustment made, in order to intervene effectively and reliably, without resorting to visual checks which may be inaccurate and which, however, require production stops.

Preferably, the aforementioned indicator signals are provided to the operator as an intelligible numerical indication.

Advantageously, the detection performed by the sensor device is not affected by a possible state of wear of the contact member, since the stress detected does not depend on it.

The detection assembly preferably comprises a pair of contact members, therefore a first contact member and a second contact member, each, in particular, in the shape of wheels, opposite each other with respect to the supply line.

Preferably the first contact member and the second contact member are opposite each other with respect to the supply line so as to engage substantially the same section of the fed elongated element on opposite sides.

The first contact member and the second contact member are preferably made by respective wheels having a rotation axis lying on the same plane orthogonal to said supply line.

Said sensitive element may be positioned, for example, on support means of said contact member, or on support means which anchor the frame of the contact member to the fixed frame of the processing apparatus of the elongated element, or, in any case, on a respective fixed part connected to the ground.

Said sensitive element may be advantageously arranged on the contact member, preferably on the respective support means, according to a certain orientation, so that said stress according to said orientation is detected, said measured stress thus being indicative of a possible deviation or distortion of the configuration of the elongated element, oriented correspondingly to said determined orientation.

Preferably the detection assembly comprises at least a pair of sensitive elements, oriented in a different way, for example on mutually incident planes, preferably orthogonal, to appreciate and distinguish any deviations or distortions of the configuration of the elongated element fed, along different directions, for example along each direction orthogonal to each said incident plane.

The apparatus may also comprise a processing unit, configured to receive said indicator signal. This processing unit may for example correlate said indicator signal received with a local configuration of the element and/or, more precisely, of the portion of the element in contact with the feedback member, for example through a processing of the curvature and/or, equivalently, of the degree of straightness of the fed element.

Preferably, the apparatus also comprises a guide or filter assembly, capable of clamping the elongated element to guide it along the supply line, upstream of the detection station, to remove, thus filter, any deviations imposed by straightening members of the drawing and/or straightening assembly or from any correction elements that are arranged immediately upstream of the detection assembly. In fact, due to their own arrangement with respect to the supply line, said straightening or correction elements cause the elongated element to cross a loop path, so as to impose both a plastic and elastic deformation of the element itself, which may distort the detection of the right configuration of the element itself by the detection assembly.

In practice, in order to correct the configuration of an element, in particular metal element, for example from a curved configuration to a rectilinear configuration, it is not sufficient to arrange the element along a straight path, but it is necessary to impose a "deformation of contrast" on the element itself, which overcomes the effect due to the inevitable spring back. The "contrast deformation" carried out by the aforementioned straightening and/or correction elements hence generates an overall deviation of the element from the supply line, even if the element itself is perfectly straightened. This overall deviation, possibly given by the sum of a specific configuration of the element and imposed by this deviation, may then distort the measurement carried out by means of the sensing element of the detection assembly, only of the specific configuration of the elongated element. For this purpose, the guide assembly function as a filter, eliminating, that is, filtering, the only effect of the deviation imposed by the interaction of the elongated element with the straightening and/or correcting members.

Advantageously, the apparatus may comprise a guide assembly or filter interposed between the drawing and/or straightening assembly and the detection station and possibly a further guide assembly interposed between said detection station and said cutting assembly, if provided.

Preferably, the sensitive element is made by means of at least a load cell and/or at least an extensometer and/or by means of a similar detection means.

Preferably, the detection assembly comprises at least a pair of contact members, opposite each other with respect to the supply line and adapted to define between them a passage channel for the element fed along the supply line.

Preferably a support frame bears said pair of contact members in a fixed manner.

Advantageously, the apparatus may comprise a plurality of pairs of contact members, arranged successively along the supply line.

Preferably, said contact member is made by means of at least one contact wheel, assembled rotatably on a plane containing said supply line, so as to be tangent to the element fed along the supply line.

Advantageously, at least one contact wheel is mounted rotatably, in particular idle, with respect to an axis of rotation orthogonal to the supply line itself.

Preferably the contact wheels are arranged idle along the supply line.

Advantageously, the apparatus according to the invention may also be used in processing plants in which several elements of elongated shape are fed, for example a pair, along respective supply lines side by side in parallel to each other.

In fact, in this case, the apparatus may provide a first detection assembly and a second detection assembly respectively for each element to be fed, comprising respective overlapping contact members or successively along the supply line.

A prerogative of the invention also consists in enabling the detection of the extent and the orientation of any deviation of the element itself from the development of the supply line through the contact between the elongated element and each contact member. Therefore, detection is obtained by means of one or more fixed members with respect to the fed element, hence in any case avoiding the occurrence of any inertia action for this purpose.

In practice, the contact element and member may be kept tight in contact, that is fixed to each other. For this reason, the measurement of the stress, therefore of the possible deviation of the configuration of the element related to it, is extremely reliable, even in the presence of irregularities in the shape of the element which, otherwise, would cause undesired relative displacements.

According to the invention the stress is measured, therefore determined to be connected to the entity and orientation of the configuration after processing by means of the processing unit of the apparatus.

The method for detecting the configuration of elongated elements, according to the invention, provides for arranging along a supply line for an element a drawing and/or straightening assembly, a detection station positioned downstream of said drawing and/or straightening assembly, a detection assembly comprising at least a first contact member arranged in the detection station and shaped to interact in contact with the element to force the element along the supply line if the configuration of the element deviates from it. Said at least first contact member is also associated with a sensor device comprising a sensitive element configured to emit a signal indicating a stress produced by the contact between said at least first contact member and the element, at least when the element is forced by the same at least first contact member along the supply line.

The method also provides for feeding the element through the detection station along the supply line, thus putting said at least first contact member into contact with the element, said contact producing said stress.

The method also provides for detecting said stress exerted by the element on said at least first contact member in contact with it by means of the emission of at least one signal indicating said stress.

The method may then provide for sending said at least one signal to a processing unit, to record said signal and possibly to process the configuration of the element by means of said processing unit and/or to send an intelligible numeric or graphic indication for the operator and/or a regulation instruction intended for said drawing and/or straightening assembly.

The method may usefully enable the detection of the extent of this stress and its orientation, so as to correspondingly process an indication of the extent and orientation of a possible deviation of the element from an ideal configuration, for example rectilinear, coinciding with the supply line.

It is also possible to arrange one or more sensitive elements associated with each contact member or wheel.

DESCRIPTION OF DRAWINGS

The details of the invention will become clearer from the detailed description of a preferred embodiment of the apparatus for detecting the configuration of elongated elements suitable for implementing the method according to the invention, illustrated only by way of non-limitative example in the accompanying drawings, wherein.

BEST MODE

Figure 1:
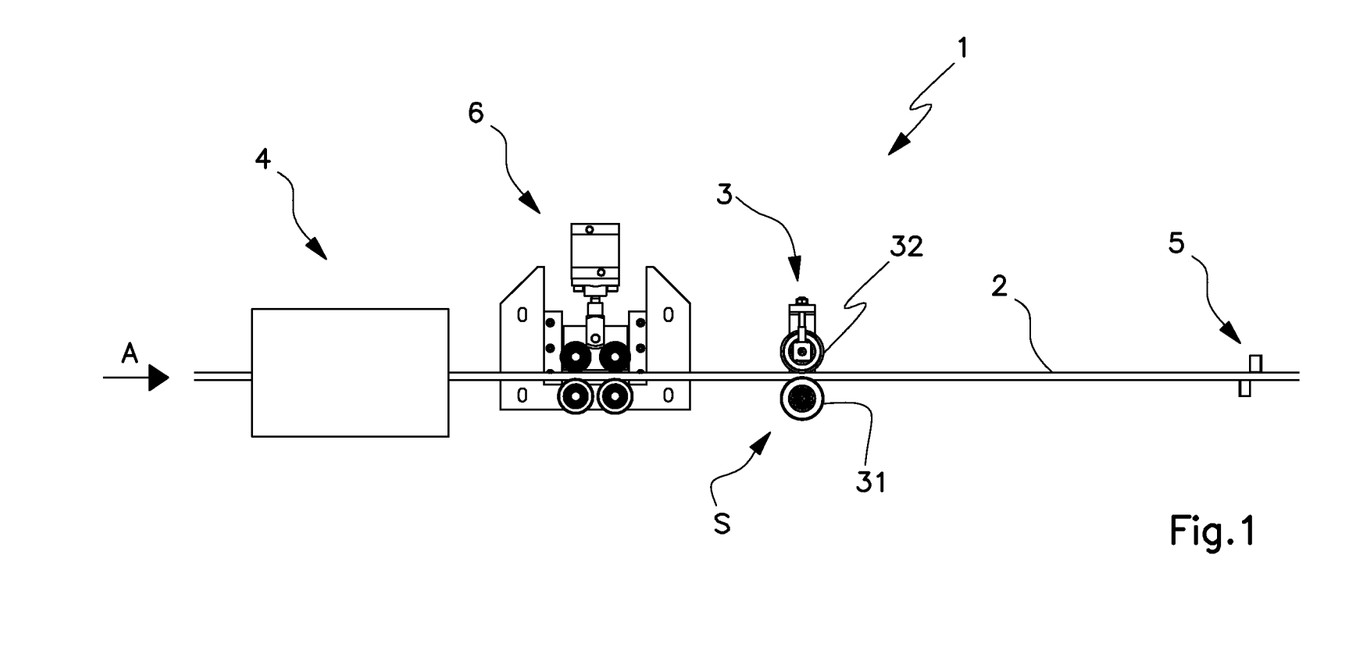
FIGS. 1 to 3 show a schematic side view of different embodiments of the apparatus according to the invention.

With particular reference to FIG. 1, the reference numeral 1 indicates as a whole an apparatus for detecting the configuration of elements 2 having an elongated shape, in particular metal elements, such as metal rods and sections.

The apparatus 1 comprises an assembly 3 for detecting the configuration of the elements 2, in particular of the curvature or, equivalently, of the degree of straightness, of the same elements 2, following for example a drawing and/or straightening process made by a drawing and/or straightening assembly 4 arranged upstream of the detection assembly 3 (see the assembly schematically illustrated in FIG. 1).

The apparatus 1 may be used in a plant for processing the elements 2, and also comprise, in a known way, an assembly for correcting the straightening, for simplicity not shown, arranged downstream of said drawing and/or straightening assembly 4. The correction assembly, if provided, is configured to correct, at least on a given correction plane, for example vertical, the straightening of the element 2 fed along a supply line A.

Preferably, but not exclusively, the supply line A may have straight development.

Both the drawing and/or straightening assembly 4 and the correction assembly may be of any type, for example with rollers, rotors, hyperbolic rotors, provided they are suitable for the purpose.

The apparatus 1 may further comprise a cutting assembly 5, for example a shears, for cutting the element 2 fed along the supply line A.

In the embodiment shown by way of example in FIG. 1, the cutting assembly 5 is made by means of a fixed part, shaped to guide the element 2 and bearing a fixed blade, and a moving part, bearing a mobile blade.

The apparatus 1 comprises, for example in said drawing and/or straightening assembly 4, or separately from it, a drawing means of any type, for example with wheels, gripper, track.

The detection assembly 3 is arranged at a detection station S, advantageously downstream of the drawing and/or straightening assembly 4 and, preferably, if present, of the correction assembly.

The detection assembly 3 is preferably interposed between the drawing and/or straightening assembly 4 and the cutting assembly 5.

It comprises at least one contact member 31, in particular a first contact member 31, arranged on one side of the supply line A, so as to be in contact, for example tangentially, with the element 2 during the feeding step, preferably with respect to an ideal straight path.

The contact member 31 is associated with a sensor device 33 for detecting the configuration, in particular instantaneous and local, of the portion of the element 2 placed in contact with the contact member 31 or, more generally, of the fed element 2.

Preferably the contact member 31 is made by means of at least one contact wheel mounted rotatably on a plane containing the supply line A, peripherally, in particular tangentially, in contact with the element 2 when it is fed along the supply line A itself.

Preferably the detection assembly 3 comprises a pair of contact members, in particular a first contact member 31 and a second contact member 32, opposite each other to the supply line A.

The first contact member 31 and the second contact member 32 preferably define between them a passage channel 34 with which the element 2 is kept in contact during the feeding step.

In practice, the element 2 transmits to the first contact member 31 and the second contact member 32 a stress, in particular of compression, by virtue of the constant contact with them.

In the presence of a configuration of the element 2 locally distant or deviating from the supply line A, for example because it is curved or irregular, this stress may undergo variations, increasing or decreasing a compression action, for example, acting on the first contact member 31 and on the second contact member 32.

The sensor device 33 then comprises a sensitive element 35, for example an extensometer, configured to emit a signal indicating this stress.

The sensitive element 35 may therefore detect a stress, in general compression or tensile one, the extent and orientation of which depend on said contact and on the orientation of any distortion of the element 2, therefore on the local configuration of the elongated element 2.

More precisely, the first contact member 31 and the second contact member 32, if provided, are preferably borne by a support frame 36, supported by arms 37 to which the sensor device 33 is applied, so as to detect any static and dynamics action, which is transmitted to the members by the element 2 through the passage channel 34.

Preferably, the support frame 36 is connected to the fixed frame of the apparatus 1, or to the ground, by means of a respective arm 37, on which at least one sensor device 33 is advantageously applied to detect the instantaneous distortion of the element 2, in any orientation thereof.

In particular, the sensitive element 35 may be housed in correspondence with a housing seat 37a obtained on the arm 37, for example having a flat shape.

Figure 4:
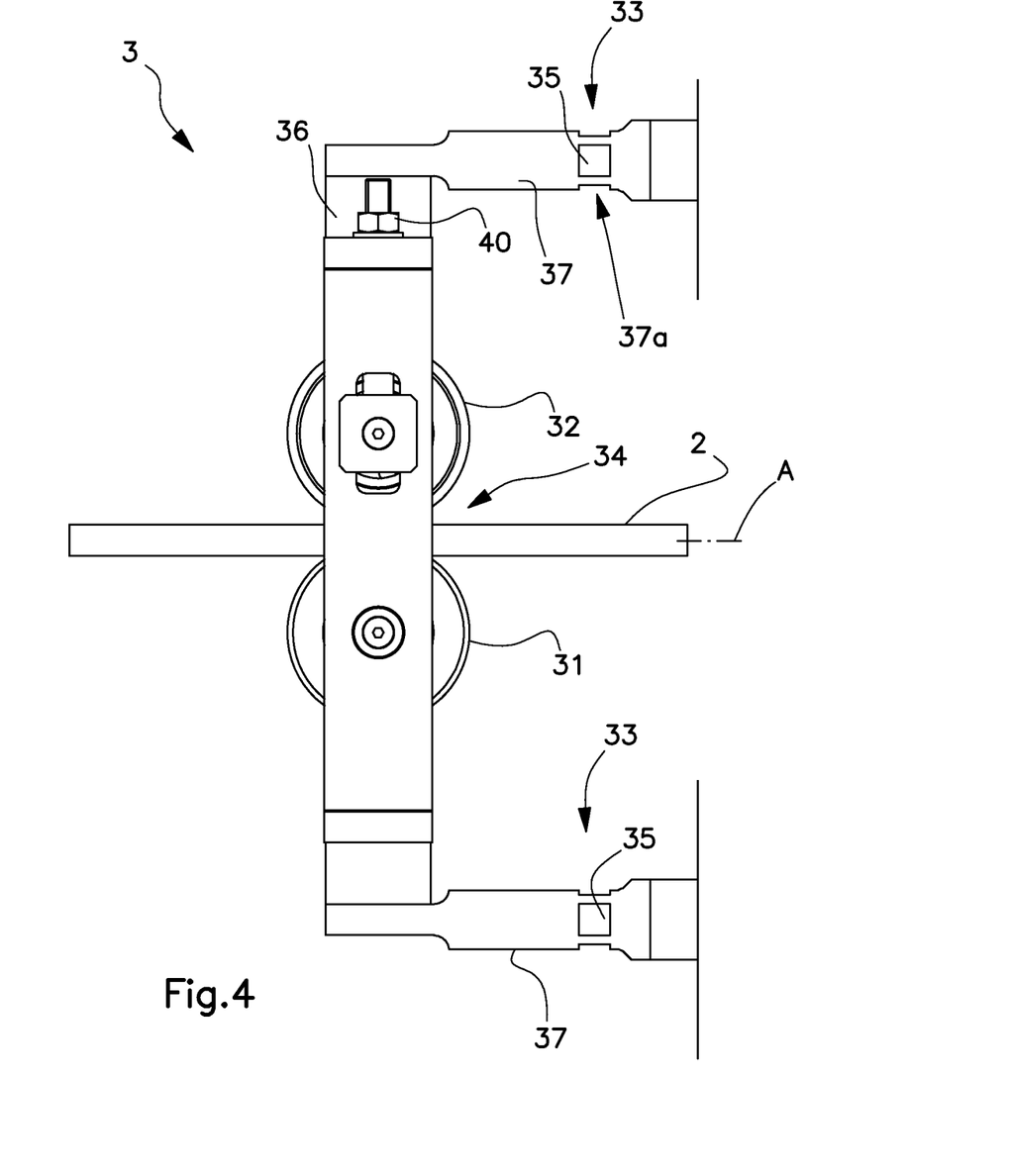
FIG. 4 shows a side view of a detection assembly used in the apparatus according to the invention.

In the embodiment shown by way of example in FIG. 4, the frame 36 is connected to the fixed frame or to the ground by means of a pair of arms 37.

Figure 5:
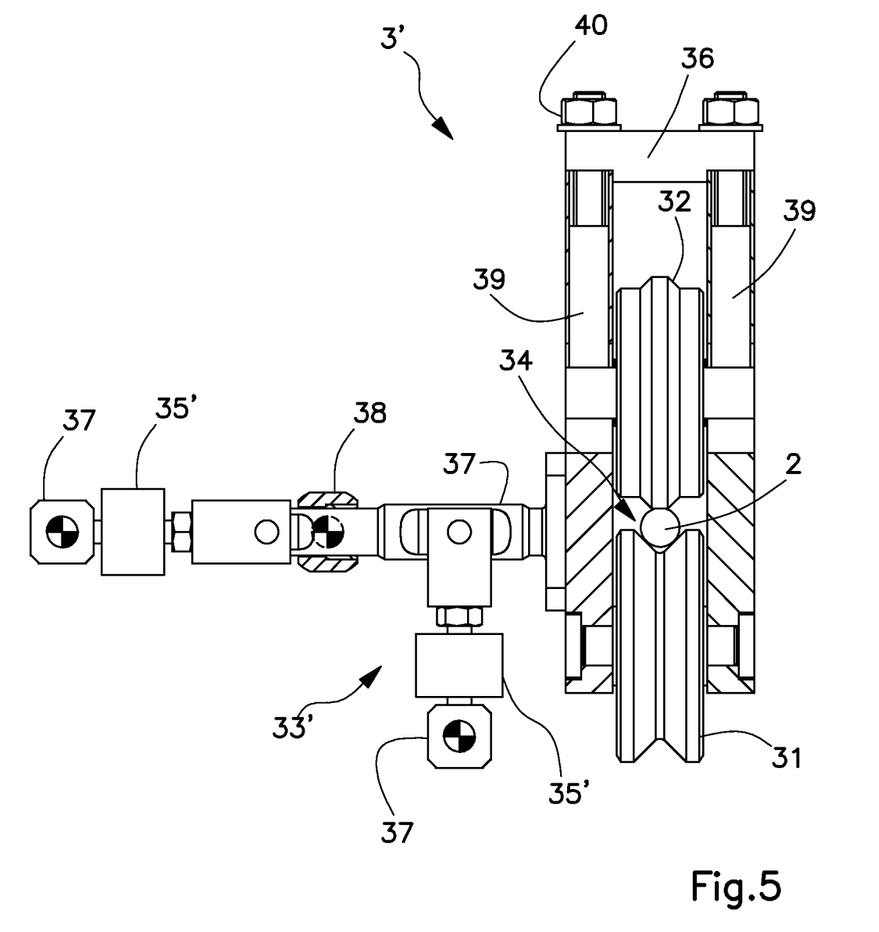
FIG. 5 is a sectional front view of a second embodiment of said detection assembly.

Alternatively or in addition, the sensor device 33' of the detection assembly 3' may comprise at least one load cell, as a sensitive element 35' (see FIG. 5).

Advantageously, to increase the sensitivity of the sensor device 33, 33', the arm 37 may be connected to the support frame 36 of the contact members 31, 32, by interposing connecting members or articulated joints 38 (see FIG. 5).

Preferably, the detection assembly 3, 3' comprises a plurality of sensitive elements 35, 35', suitably arranged, for each contact member 31, 32 or on only one of them, to detect said stresses in different directions in space, for example mutually incident, in particular orthogonal, horizontal and vertical. For example, a pair of sensitive elements 35, 35' may be arranged so that the sensitive elements 35, 35' themselves are oriented on the arm 37 or on the contact member 31, 32 so as to detect the stresses on a pair of mutually inclined planes, preferably orthogonal.

In order to improve the reliability of detection, the sensitive elements 35, 35' may be arranged on the contact members 31, 32 themselves and/or around the arm 37, for example both on the internal and external part of the arm 37, on the upper and lower surfaces, to appreciate and distinguish any deviations of the configuration of the element 2 along respective detection directions. In the same way, the sensitive elements 35, 35' may be arranged on each arm 37. Alternatively, it is possible to provide that the arm 37 houses a pair of sensitive elements 35, 35' on mutually incident planes, preferably orthogonal, for example for measuring deviations along a first direction and a direction, preferably orthogonal, inclined to it. For example, distortions of the configuration of the element 2 along the perpendicular and along the horizontal may be detected, determined and distinguished, thanks to the invention.

In the frequent case where the supply line A is rectilinear, the passage channel 34 is arranged along it according to a substantially rectilinear path. Therefore, the first contact member 31 and the second contact member 32 are advantageously made by means of mounted free idle wheels supported by the fixed support frame 36. When the passage channel 34 is crossed by a portion of the element 2 which has a local curvature, the support frame 36, being fixed, is not subject to movement. On the contrary, it is stimulated by element 2, reacting in turn with a corresponding binding reaction, detectable by sensitive element 35, 35'.

The first contact member 31 and the second contact member 32, in particular made of contact wheels, may be kept mutually tightened on the element 2 by elastic-type contrast means 39, for example springs, preferably preloaded through an adjustment member 40 associated with the support frame 36 (see FIGS. 4 and 5).

In particular, the first contact member 31 and the second contact member 32, preferably wheels, are preferably borne by the same support frame 36.

Preferably the first contact member 31 is fixedly borne by the support frame 36, while the second contact member 32, for example located above the feed supply line A, is borne by the support frame 36 in a slidingly adjustable manner, by interposing the aforementioned contrasting means 39, to adjust the tightening of the element 2 even when the transverse dimension changes.

The apparatus may usefully also comprise at least one guide assembly or filter 6 arranged upstream of the detection assembly 3, to guide the element 2 along the supply line A, thus filtering, therefore removing, deviations of the element 2 imposed by correction or straightening members arranged upstream of the detection assembly 3, and allowing the detection only of any residual curvature or the degree of straightness, specific of the element 2.

The guide or filter assembly 6 may be made, for example, by means of a guide sleeve or by means of one or, equivalently, several pairs of opposed wheels, preferably idle, but adapted to tighten the element 2, as shown in FIG. 1, to guide it effectively.

In this way undesired deviations, as well as the onset of vibrations that can disturb the detection of the proper configuration of the element 2, through the detection assembly 3, are greatly reduced.

The method according to the invention, as well as the operation of the apparatus according to the invention, are easily understandable from the above description.

The element 2 is fed along the supply line A, preferably through the drawing and/or straightening assembly 4.

The element 2 is then led through the guide assembly or filter 6, to eliminate the effect of the deviation produced by any correction members or other mechanical members, if provided.

Downstream of the guide assembly 6, the element 2 arrives inside the detection assembly 3, in particular through the passage channel 34.

When crossing the passage channel 34, the element 2 is in contact with the first contact member 31 and with the second contact member 32.

The sensor devices 33, 33' detect, preferably continuously, the stresses exerted by the element 2 on the first contact member 31 and on the second contact member 32, which may vary due to a residual curvature or other local irregularity of the configuration of the element 2, which separates it from the supply line A.

The processing unit of the apparatus 1 therefore receives, from the respective sensitive elements 35, 35' of the individual sensor devices 33, 33', a sequence of signals which enable the determination of the configuration of the element 2 and, therefore, the relative degree of straightness or curvature, useful to possibly correct the adjustment of the straightening members carried out by the respective straightening and/or correction assemblies arranged upstream of the detection assembly 3.

Advantageously, the apparatus enables the determination and the distinction of the entity and of orientation of any distortion of the elongated element, quantifying it, and/or the correction to be made on the suitable bodies.

Figure 2:
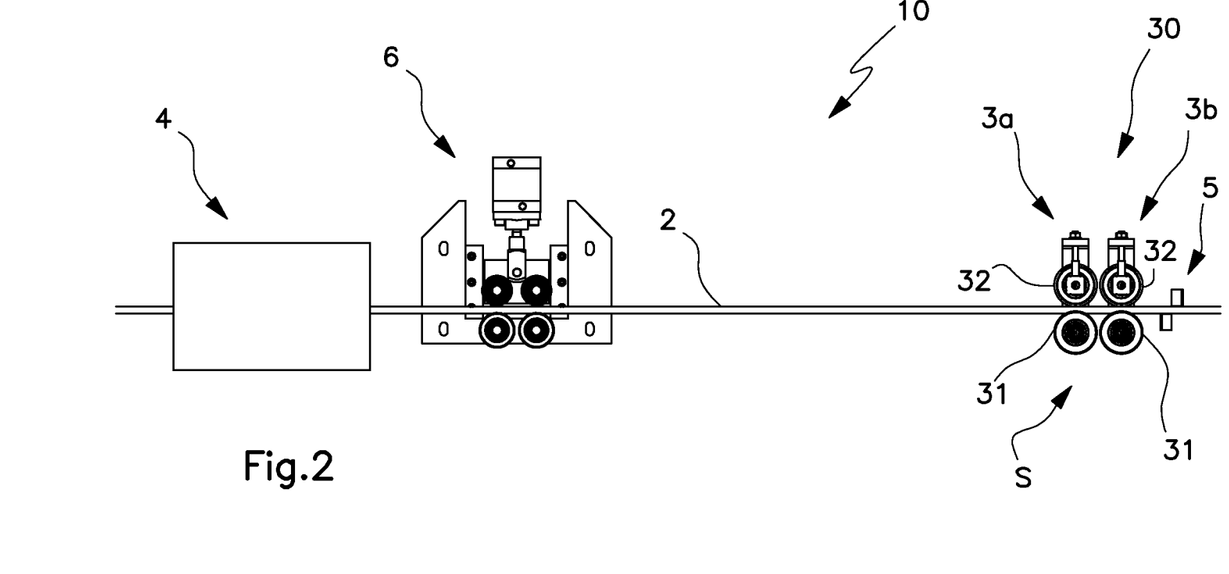

According to a further embodiment, illustrated in FIG. 2, the apparatus 10 comprises a detection assembly 30 comprising in turn a first pair 3a of contact members 31, 32 and a second pair 3b of contact members 31, 32.

The first pair 3a and the second pair 3b are preferably brought together along the supply line, one after the other, preferably immediately upstream of the cutting assembly 5.

The operation of the apparatus 10 is quite similar to what was described above for the embodiment shown in FIG. 1.

Figure 3:
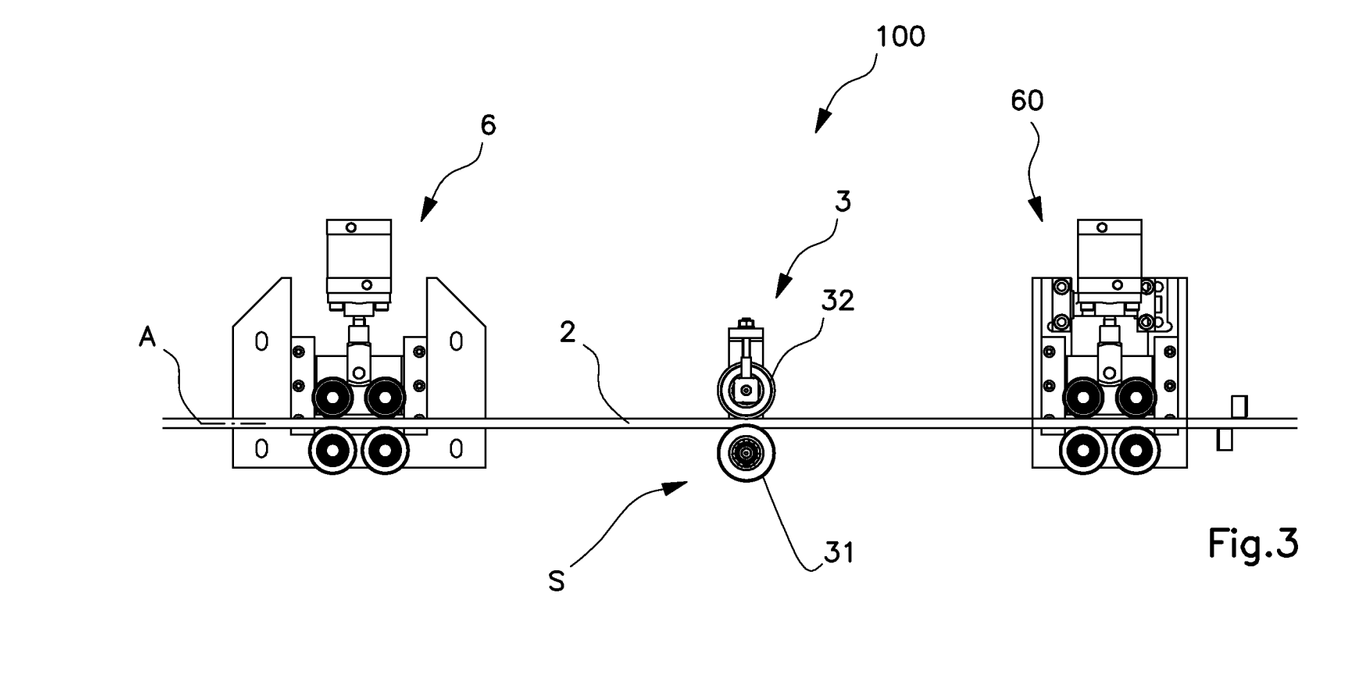

According to a further embodiment, shown in FIG. 3, the apparatus 100, otherwise quite similar constructively and functionally to the embodiment shown in FIG. 1, includes an additional guide assembly or filter 60 arranged downstream of the detection assembly 3.

This embodiment ensures greater accuracy in the detection of the configuration of element 2, as the additional guiding assembly or filter 60 ensures the complete removal of any stresses and possibly vibrations, induced on element 2, for example as a result of the cantilevered condition that it can take downstream of the cutting assembly 5. These stresses may be further accentuated by bend operations carried out downstream of the cutting assembly 5.

Figure 6:
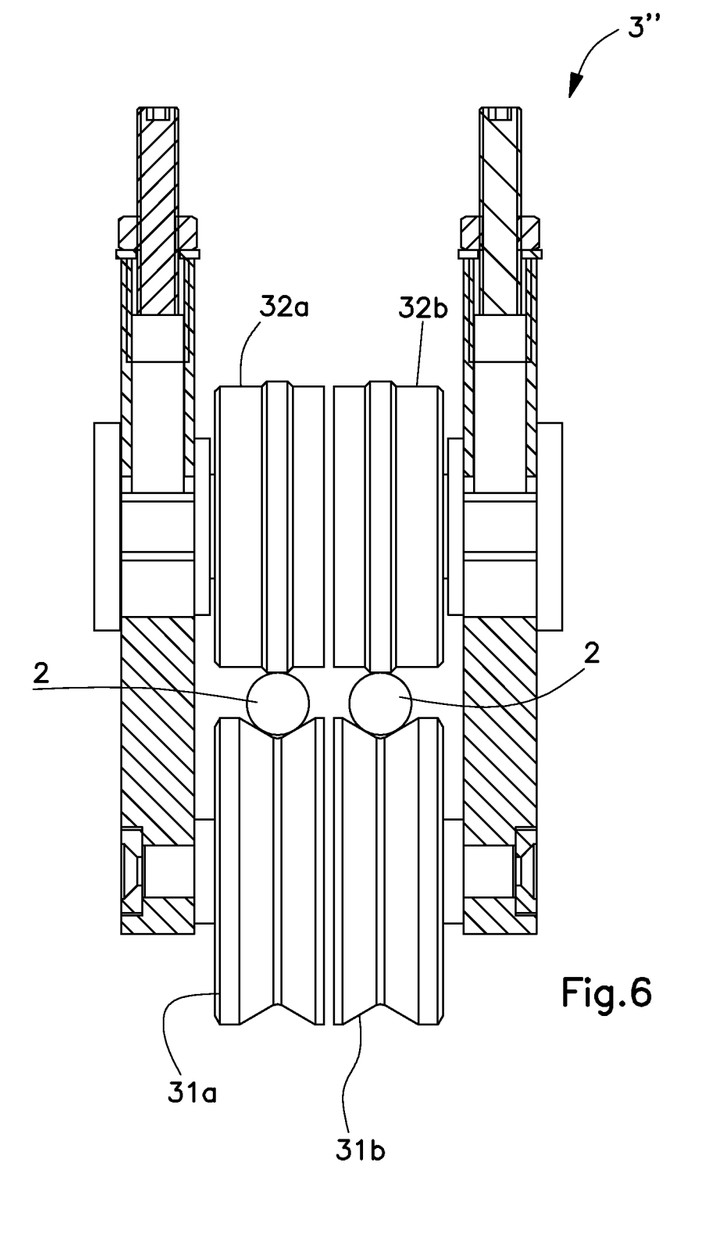
FIGS. 6 and 7 show a sectional front view and a side view, respectively, of a third embodiment of the detection assembly.

According to an embodiment shown in FIG. 6, the apparatus according to the invention is intended to supply a pair of elements 2, in particular metal elements, along each other's supply lines A arranged side by side. The detection assembly 3' then includes at least one contact member 31a, 31b for each fed element 2. Ultimately, the 3' detection assembly consists of or includes a pair of detection assemblies 3, preferably independent from each other, so that they may make independent detections without mutual interference.

Figure 7:
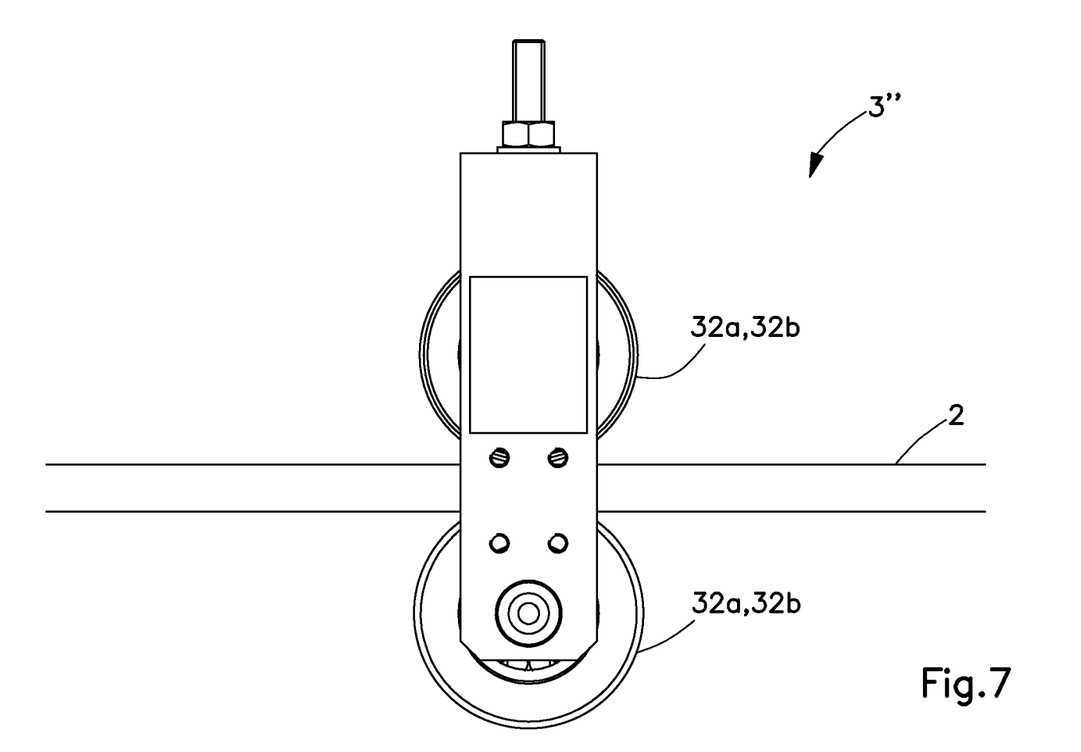

Preferably the detection assembly 3' includes a first contact member 31a, 31b and a second contact member 32a, 32b, opposite each other to the supply line, for each element 2 to be detected. In the embodiment shown in FIG. 7, for example, the aforementioned pairs of contact members are superimposed across the supply lines of their respective elements 2.

Figure 8:
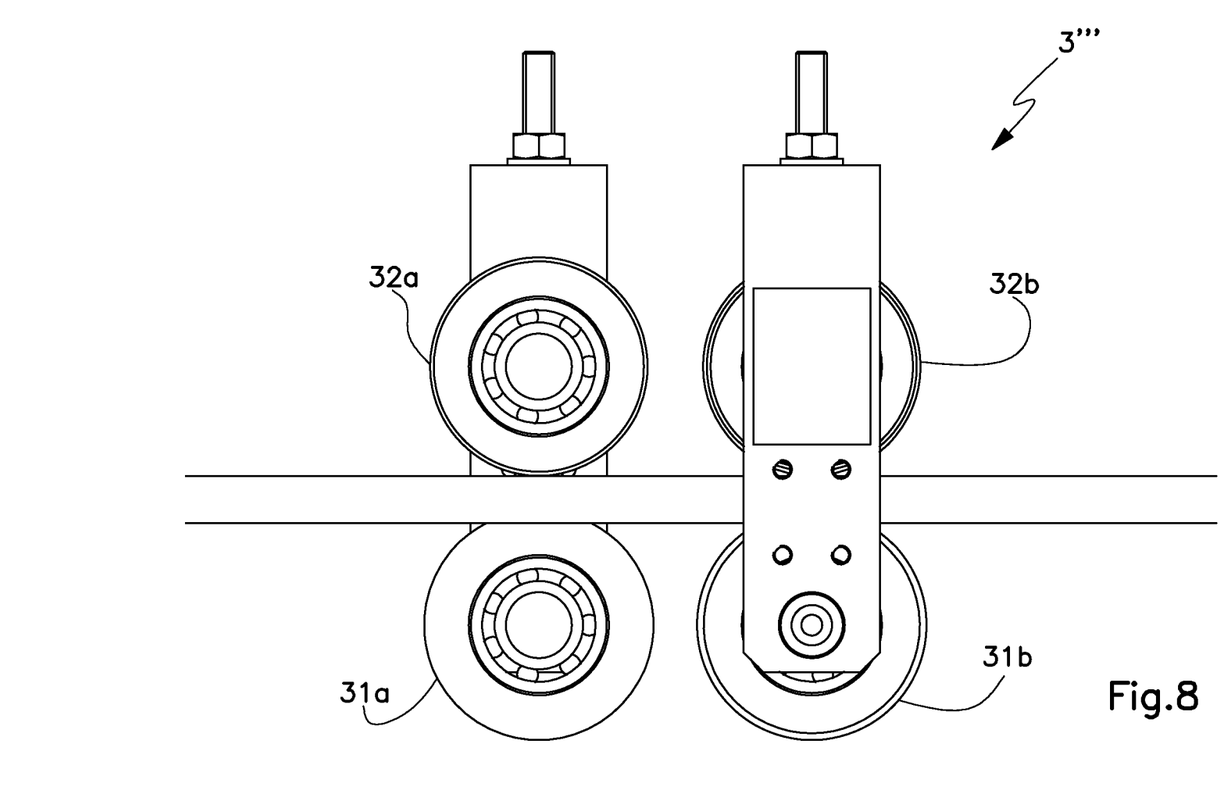
FIG. 8 shows a side view of a fourth embodiment of the detection assembly used in the apparatus according to the invention.

According to a further embodiment shown in FIG. 8, the apparatus according to the invention is, as in the previous case, intended to feed a pair of elements 2 side by side along respective supply lines. In this case, however, the contact members of the detection device 3' are placed staggered, in succession, along the feed direction of elements 2. In particular, preferably, the pairs of contact members 31a, 32a and 31b, 32b are arranged in succession along said feed direction.

The apparatus according to the invention therefore enables the detection of any deviation of element 2 from the supply line, especially from a straight configuration, and even when the fed elements are more than one.

The sensing apparatus described as an example is subject to numerous changes and modifications depending on the different needs.

In the practical embodiment of the invention, the materials used, as well as the shape and the dimensions, may be modified depending on requirements.

Should the technical features mentioned in any claim be followed by reference signs, such reference signs were included strictly with the aim of enhancing the understanding of the claims and hence they shall not be deemed restrictive in any manner whatsoever on the scope of each element identified for exemplifying purposes by such reference signs.

The invention claimed is:

1. A method for detecting the configuration of rods for reinforced concrete, the method comprising the steps of
   a. providing a drawing and/or straightening assembly along a supply line for one said rod, a detection station arranged downstream of said drawing and/or straightening assembly, a detection assembly comprising at least a first contact member arranged in said detection station and shaped to interact in contact with said rod to force said rod along said supply line if said configuration of said rod is deviating with respect thereto, said at least first contact member being associated with a sensor device comprising a sensitive element configured to emit a signal indicating a stress produced by the contact between said at least first contact member and said rod, at least when said rod is forced by said at least first contact member along said supply line;
   b. feeding said rod through said detection station along said supply line, thus bringing said at least first contact member into contact with said rod, said contact producing said stress;
   c. detecting by means of said sensitive element said stress exerted by said rod on said at least first contact member, in contact with said at least first contact member, by emitting at least one signal indicating said stress;
   d. sending said at least one signal to a processing unit of said detecting assembly;
   e. correlating by means of said processing unit said received indicator signal to said configuration of said rod, processing a display of said configuration in an intelligible form for an operator and/or a corresponding adjustment instruction for said drawing and/or straightening assembly.

2. A method as in claim 1, wherein said step c. of detecting by means of said sensitive element said stress provides for measuring said stress, so as to determine an extent of a possible deviation of said rod from a desired configuration.

3. A method as in claim 1, wherein said step c. of detecting by means of said sensitive element said stress provides for determining said stress, said step e. of correlating said indicator signal providing for distinguishing an orientation of a possible deviation of said rod from a desired configuration.

4. A method as in claim 1, wherein said step a. of arranging a drawing and/or straightening assembly provides for further arranging a second contact member, opposed to said first contact member with respect to said supply line, said first contact member and said second contact member are kept mutually tightened on said rod by contrast means during the feeding of said rod.

5. A method as in claim 1, further comprising the further step of tightening said rod by means of at least one guide assembly or filter arranged along said supply line at least upstream of said detection assembly, to remove, by tightening said rod, any deviations imposed on said rod by said drawing and/or straightening assembly or by correction elements arranged upstream of said guiding assembly.

6. A method as in claim 1, further comprising providing a cutting assembly downstream of said detection station.

7. An apparatus for detecting the configuration of rods for reinforced concrete, the apparatus comprising:
   a drawing and/or straightening assembly,
   a detection station positioned downstream of said drawing and/or straightening assembly,
   a detection assembly comprising at least a first contact member arranged in said detection station and shaped to interact in contact with said rod to force said rod along a supply line if said configuration of said rod deviates from said supply line, said at least first contact member being associated with a sensor device comprising a sensitive element configured to emit a signal indicating a stress produced by the contact between said contact member and said rod, at least when said rod is forced by said contact member along said supply line,
   a processing unit configured to receive said indicator signal emitted by said sensitive element and to correlate said indicator signal received to said configuration of said rod, by processing a display of said configuration in an intelligible form for an operator and/or a corresponding adjustment instruction for said drawing and/or straightening assembly.

8. An apparatus as in claim 7, wherein said sensitive element is arranged on said first contact member or on respective support means, according to a certain orientation, so as to detect said stress according to said orientation, said measured stress thus being indicative of a possible deviation of the configuration of the rod, oriented correspondingly to said determined orientation.

9. An apparatus as in claim 7, further comprising a second contact member to provide a pair of contact members formed by said first contact member and by said second contact member, opposite to said supply line in said detection station and capable of defining between them a passage channel for said rod along said supply line.

10. An apparatus as in claim 9, wherein said first contact member and said second contact member are kept tight on said rod by contrast means.

11. An apparatus as in claim 7, wherein each said contact member comprises means of a wheel mounted rotatably on a plane containing said supply line and tangent in contact with said rod when said rod is fed along thereof.

12. An apparatus as in claim 7, wherein said detection assembly comprises a first pair of contact members and a second pair of contact members, arranged in succession along said supply line.

13. An apparatus as in claim 7, further comprising a guide or filter assembly arranged downstream of said drawing and/or straightening assembly and upstream of said detection station for guiding by tightening said rod fed along said supply line, thus removing deviations imposed on said rod by straightening members or by other correction members arranged upstream of said guide assembly or filter.

14. An apparatus as in claim 7, wherein said contact member is mounted on a support frame, said sensor device being applied to said support frame.

15. An apparatus according to claim 14, wherein said sensor device is mounted on an arm connected to said support frame.

16. An apparatus as in claim 15, wherein said arm comprises a housing seat with a flattened shape for receiving said sensitive element.

17. An apparatus as in claim 16, wherein said arm is connected to said support frame through interposition of at least one articulated connection member, so as to increase sensitivity of said sensitive element to detect said stress.

18. An apparatus as in claim 14, wherein said sensor device comprises at least a first sensor element and a second sensor element oriented according to mutually incident planes, so as to appreciate and distinguish deviations of the configuration of said rod oriented correspondingly.

19. An apparatus as in claim 7, wherein said sensor device is made of at least one extensometer.

20. An apparatus as in claim 7, wherein said sensitive element is made by means of at least one load cell.

21. An apparatus as in claim 7, further comprising at least one cutting assembly arranged downstream of said detection station.

22. An apparatus as in claim 7, further comprising at least one bending assembly arranged downstream of said detection station.

23. An apparatus as in claim 7, wherein a pair of rods are fed along respective supply lines arranged side by side, said detection assembly comprising at least one said first contact member for each fed rod and, a second contact member, opposite to said first contact member, for each fed rod, for detecting respective configurations of said fed rods.

* * * * *